J. J. Johnston.
Hydrocarbon Still.
No. 91,447. Patented Jan. 16, 1869.
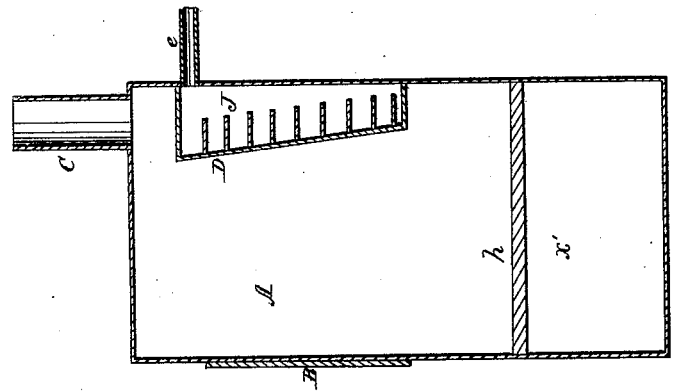
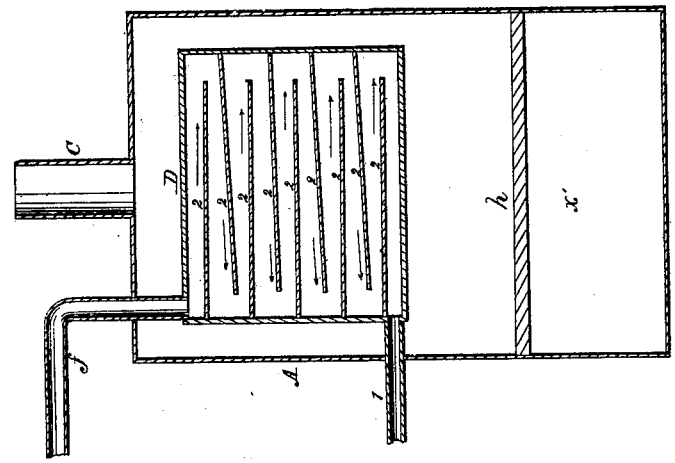
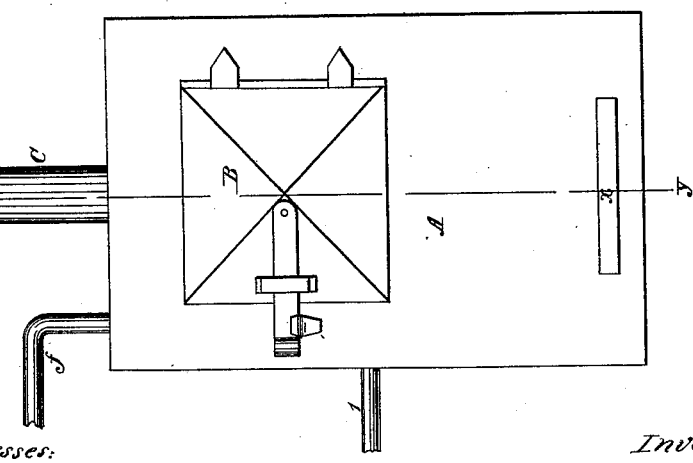
Witnesses:
A. C. Johnston
W. Johnston
Inventor:
James J. Johnston

United States Patent Office.

JAMES J. JOHNSTON, OF ALLEGHENY CITY, ASSIGNOR TO JOHN T. TYLER, A. R. HURST, HENRY M. MYERS, AND DAVID M. ARMOR, OF PITTSBURG, PENNSYLVANIA.

Letters Patent No. 91,447, dated June 15, 1869; antedated June 12, 1869.

IMPROVED APPARATUS FOR DISTILLING HYDROCARBONS.

The Schedule referred to in these Letters Patent and making part of the same.

*To all whom it may concern:*

Be it known that I, JAMES J. JOHNSTON, of the city and county of Allegheny, in the State of Pennsylvania, have invented a new and useful Improvement in Distilling Hydrocarbon-Oil; and I do hereby declare that the following is a full, clear, and exact description thereof, reference being had to the accompanying drawings, and to the letters and figures of reference marked thereon.

The nature of my invention consists in distilling hydrocarbon-oil, by causing it to flow constantly, and in a thin sheet, along through layers of charcoal, on inclined ways, inside of an evaporating-chamber, and arranged so that the oil will flow along one inclined way, and drop down on to a second inclined way, and flow along it, and thus flow along and drop down from one inclined way to another, until it has passed over a whole series of the inclined ways, or until the oil has become evolved into vapor.

To enable others skilled in the art to make and use my invention, I will proceed to describe its construction and operation.

In the accompanying drawings, which form part of my specification—

Figure 1 is a side elevation of my improvement in apparatus for distilling hydrocarbon-oil.

Figure 2 is a vertical section of the same.

Figure 3 is a vertical section, when cut through at line $y$ of fig. 1.

In the drawings—

A represents the furnace, which is made of sheet-metal, and is provided with a fire-door, B, stack C, fire-chamber $h$, and ash-pit $x$.

Inside of the furnace A is placed an evaporator, D, which is provided with a series of inclined ways, marked 2, and vapor-space, J.

On the side of the evaporator D, near the top, is attached a series of pipes, $e$, which are connected to a condenser, of any of the known forms.

To the top, and next one end of the evaporator, is connected the supply-pipe $f$, connecting with the oil-reservoir.

This supply-pipe $f$ should be provided with a valve, for the purpose of regulating the flow of oil into the evaporator D.

At one end of the evaporator D, close to its bottom, is attached a pipe, 1, which is also to be provided with a valve.

The pipe 1 is used for a twofold purpose:

First, to ascertain whether the flow of oil into the evaporator is greater than the capacity of the evaporator to evolve it into vapor.

Second, to draw off heavy oil, when it is desirable to evolve only the lighter portion of the oil flowing into the evaporator.

The side of the evaporator D, next to the fire, and on which the inclined ways 2 are placed, should be inclined, as shown in fig. 3, and the evaporator should gradually increase in width from the bottom to its top, (see fig. 3,) for the purpose of having the greatest space for vapor next to the top of evaporation.

X represents a narrow opening, leading into the ash-pit, for the purpose of admitting air to the fire of the furnace.

As the construction and arrangement of the several parts which compose my improvement in apparatus for distilling hydrocarbon-oil, will readily be understood by the skilful mechanic, by reference to the accompanying drawings, and from the foregoing description, I will, therefore, without further description of its construction, proceed to describe its operation, which is as follows:

Having all things constructed and arranged, as hereinbefore described, the pipe $f$ being connected to the reservoir of oil, and the pipes $e$ attached to a suitable condenser, I place, on the inclined ways 2, a layer of small pieces (about the size of chestnuts) of wood charcoal.

After an opening made in the evaporator, for the purpose of supplying the inclined ways with charcoal, and for any other desirable purpose, has been closed, a fire is started in the furnace, and, as soon as the evaporator D, and the inclined ways with their layers of charcoal, have become sufficiently heated, the valve of the pipe $f$ is opened, so as to allow the hydrocarbon-oil to flow in on the upper inclined way, and, flowing along on it, will drop down, at the end of it, on to the next inclined way, and thus flow along from one inclined way to another, until the oil has passed over the whole series of inclined ways, or until it has become evolved.

When I desire to take off only the lighter part of the oil, I allow the oil to flow into the evaporator D, beyond the capacity of the evaporator to evolve it, the flow being in proportion to the gravity of oil desired; that is to say, if a heavy oil is desired, then the flow of oil into the evaporator should be slow. Hence, it will readily be understood that the gravity of the oil, drawn off at pipe 1, will depend on the flow of oil into the evaporator, and on its evolving capacity.

The oil, after being distilled, as hereinbefore described, may be treated and manipulated in any of the known methods, and the "naphtha," or "benzole," may be separated from the heavy oil by redistillation, or other known means.

Having thus described the nature of my improvement,

What I claim as of my invention, is—

1. Evolving hydrocarbon-oil into a vapor, by causing it to flow through a series of layers of charcoal, placed on inclined ways, arranged in a chamber, substantially as herein described, and for the purpose set forth.

2. Separating the lighter part of hydrocarbon-oil from the heavy part, by causing it to flow through a series of layers of charcoal, placed on a series of inclined ways, arranged in a chamber, provided with suitable means for drawing off the heavy part of the hydrocarbon-oil, substantially as herein described, and for the purpose set forth.

3. The evaporator D, provided with inclined ways 2, and pipes $f$, $e$, and 1, constructed, arranged, and operating substantially as herein described, and for the purpose set forth.

JAMES J. JOHNSTON.

Witnesses:
GEO. H. THOMAS,
L. C. THOMAS.